(12) United States Patent
Lewis et al.

(10) Patent No.: US 10,733,068 B1
(45) Date of Patent: *Aug. 4, 2020

(54) METHOD AND SYSTEM FOR IMPLEMENTING A DIGITAL APPLICATION ARCHITECTURE WITH DISTINCT PROCESSING LANES

(71) Applicant: JPMorgan Chase Bank, N.A., NY, NY (US)

(72) Inventors: Michael L. Lewis, Stamford, CT (US); Richard J. Romanelli, Elmhurst, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/471,517

(22) Filed: Mar. 28, 2017

Related U.S. Application Data

(63) Continuation of application No. 14/568,780, filed on Dec. 12, 2014, now Pat. No. 9,652,341.

(51) Int. Cl.
| | |
|---|---|
| *G06F 11/20* | (2006.01) |
| *G06F 16/951* | (2019.01) |
| *G06F 16/958* | (2019.01) |
| *H04N 21/858* | (2011.01) |

(Continued)

(52) U.S. Cl.
CPC ...... *G06F 11/2038* (2013.01); *G06F 11/2046* (2013.01); *G06F 16/951* (2019.01); *G06F 16/972* (2019.01); *G06F 3/048* (2013.01); *H04N 21/85* (2013.01); *H04N 21/8583* (2013.01)

(58) Field of Classification Search
CPC .... G06F 11/20; G06F 11/2005; G06F 11/202; G06F 11/2047; G06F 11/2048; G06F 3/0481; G06F 3/048; G06F 3/04812; H04N 21/431; H04N 21/4312; H04N 21/4316; H04N 21/85; H04N 21/858; H04N 21/8583; H04N 21/4438; H04N 21/462; H04N 21/4622; H04N 21/4627
See application file for complete search history.

(56) References Cited

U.S. PATENT DOCUMENTS 6,144,999 A * 11/2000 Khalidi ............... G06F 11/2064
709/219
6,466,980 B1 10/2002 Lumelsky et al.
(Continued)

*Primary Examiner* — Joseph O Schell
(74) *Attorney, Agent, or Firm* — Hunton Andrews Kurth LLP

(57) ABSTRACT

According to an embodiment of the present invention, an automated computer implemented method and system for implementing a digital application architecture comprising: a first co-location comprising: a first pod that supports a first subset of users; the first pod comprising a plurality of designated processing lanes, where a first processing lane supports a first business function, a second processing lane supports a second business function; and a third processing lane supports a third remote business function across a network; a second pod that supports a second subset of users; and a failover pod that supports one or more other pods from a second co-location; and an enterprise that replicates data for the first subset of users and the second subset of users and transmits the replicated data to the first co-location.

20 Claims, 13 Drawing Sheets

(51) Int. Cl.
*H04N 21/85* (2011.01)
*G06F 3/048* (2013.01)

(56) References Cited

U.S. PATENT DOCUMENTS

| | | | |
|---|---|---|---|
| 6,578,068 B1* | 6/2003 | Bowman-Amuah | G06F 9/465 709/203 |
| 7,363,371 B2* | 4/2008 | Kirkby | H04L 47/11 709/225 |
| 7,536,002 B1 | 5/2009 | Ma et al. | |
| 8,121,944 B2 | 2/2012 | Norman et al. | |
| 8,374,333 B1 | 2/2013 | Ma et al. | |
| 8,386,381 B1 | 2/2013 | Barton et al. | |
| 8,396,798 B2 | 3/2013 | Norman et al. | |
| 8,687,790 B2 | 4/2014 | Ma et al. | |
| 8,811,177 B1 | 8/2014 | Toudeh-Fallah et al. | |
| 8,995,643 B2 | 3/2015 | Ma et al. | |
| 9,652,341 B1* | 5/2017 | Lewis | G06F 11/203 |
| 2005/0154620 A1* | 7/2005 | Hentschel | G06Q 10/02 705/5 |
| 2005/0163047 A1* | 7/2005 | McGregor | H04W 24/00 370/229 |
| 2005/0220088 A1 | 10/2005 | Smith et al. | |
| 2006/0129561 A1* | 6/2006 | Chobert | G06F 16/182 |
| 2006/0277596 A1* | 12/2006 | Calvert | H04L 63/0218 726/3 |
| 2007/0027754 A1* | 2/2007 | Collins | G06Q 10/0631 705/14.48 |
| 2007/0159965 A1 | 7/2007 | Kopf et al. | |
| 2008/0243852 A1* | 10/2008 | Brunner | G06Q 10/10 |
| 2008/0301701 A1* | 12/2008 | Khijniak | G06F 21/57 719/311 |
| 2009/0063897 A1* | 3/2009 | Highleyman | G06F 11/1492 714/10 |
| 2012/0134355 A1* | 5/2012 | Vendrow | G06F 11/2048 370/389 |
| 2013/0212163 A1* | 8/2013 | Shimomoto | H04N 1/00225 709/203 |
| 2016/0134689 A1* | 5/2016 | Vendrow | H04L 67/104 709/204 |

\* cited by examiner ized manner. This poses an operational risk where a breach or failure will affect the entire pool of data and subsequently every customer and user known to the company.

Other drawbacks may also be present.

SUMMARY OF THE INVENTION

Accordingly, one aspect of the invention is to address one or more of the drawbacks set forth above. According to an embodiment of the present invention, a method and system for implementing a digital application architecture comprising: a first co-location comprising: a first pod that supports a first subset of users; the first pod comprising a plurality of designated processing lanes, where a first processing lane supports a first business function, a second processing lane supports a second business function; and a third processing lane supports a third remote business function across a network; a second pod that supports a second subset of users; and a failover pod that supports one or more other pods from a second co-location; and an enterprise that replicates data for the first subset of users and the second subset of users and transmits the replicated data to the first co-location.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF PREFERRED EMBODIMENTS

Figure 1:
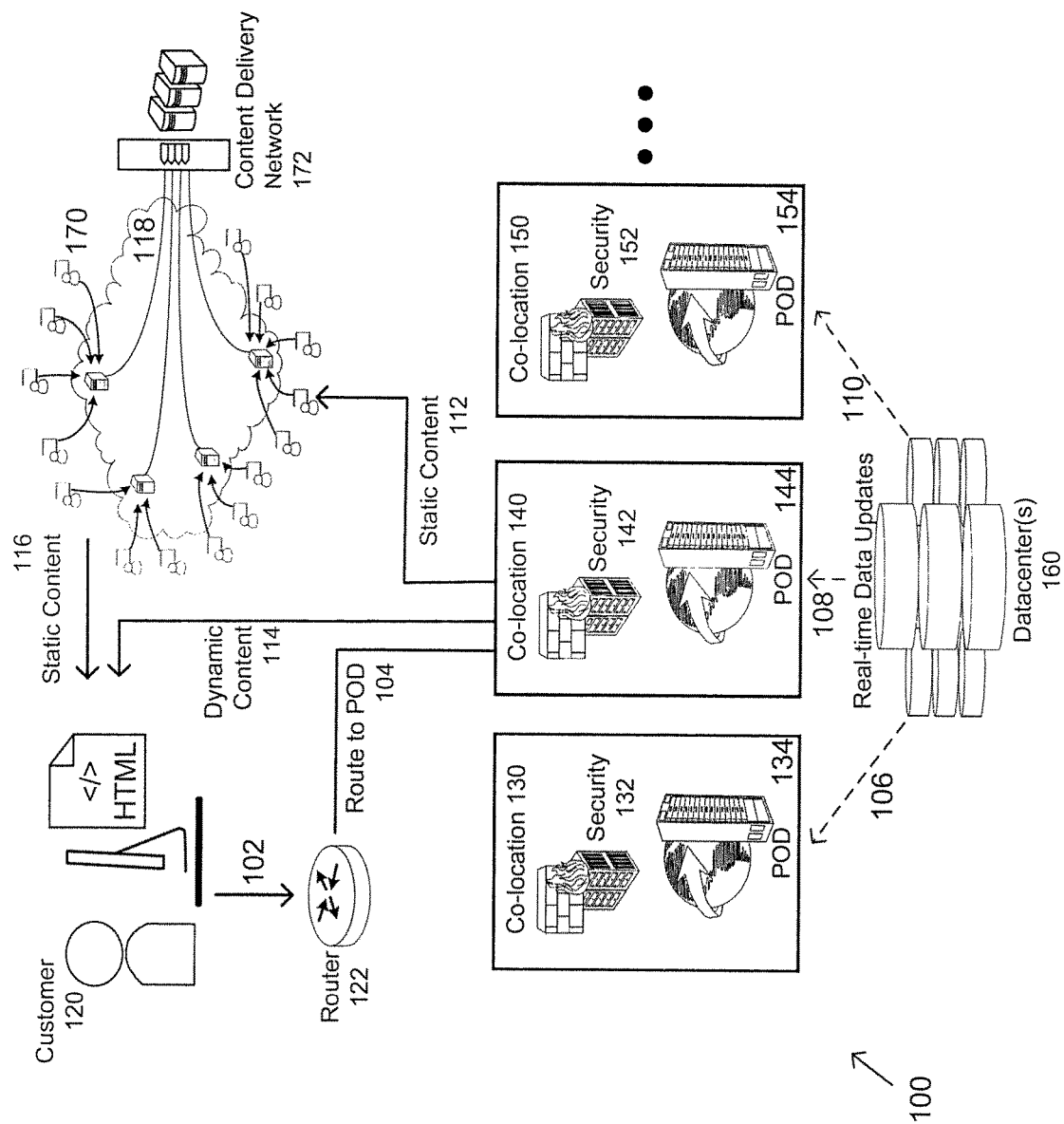
FIG. 1 is an exemplary diagram of a Pod-based digital architecture, according to an embodiment of the present invention.

An embodiment of the present invention is directed to a digital application architecture that provides a dependable digital experience with improved availability and reduced outages through modularization.

An embodiment of the present invention recognizes an operational risk associated with a centralized architecture for managing resources, including servers, databases, networks, etc. An embodiment of the present invention is directed to decomposing a current environment to isolate a part of the system that is experiencing some type of failure or impediment. By isolating failures, customers are also isolated from one another and the scope of any impact from the failure may be reduced and/or confined. This allows the rest of the system to function properly and without a slowdown.

An embodiment of the present invention recognizes that a problem in one area may quickly impact other areas, functions, features, etc. For example, such events may include a corrupted file, fraud or other compromise, backed-up queue, processing delays, shut down, etc. Any one of these events, over time, can bring a website down or cause the website to operate slowly.

An embodiment of the present invention is directed to isolating failures into a specific compartment. For example, processes may be dedicated to specific functions, e.g., read, write, tasks, etc. An embodiment of the present invention is directed to read/write modularity where dedicated processing compartments or lanes (also referred to as swim lanes) process read functionality and write functionality separately. According to an exemplary application, processing lanes may be reserved for logins, payment, view balance, and/or other functions. For example, processing lanes may represent a division of workload, which may correspond to business functions. The business functions may be pre-defined (e.g., wire transfer, payment, view balance, etc.) and/or customized for a particular user or type of user. According to another example, processing lanes may be dedicated based on how a customer interacts with the website or other interface. An embodiment of the present invention may recognize that a customer of a banking website performs read functions 80% of the time and write functions for 10-20% of the time. The read functions may include accessing data, e.g., viewing balance information. The write functions may include taking an action, e.g., pay a loan, open a new line of credit, etc. Other dedicated processes may be implemented for other applications and businesses.

An embodiment of the present invention further divides the processing lanes by where the processing occurs, e.g., local processing, remote processing, etc. For example, read functions may be further divided into read local and read remote. Write functions may be divided into write local and write remote. Local functions may refer to processing performed at local devices or systems, e.g., local server, local disk, local Pod, local co-location. Remote functions may refer to functions performed over a network to an enterprise system, other centralized system, or other remote system or device.

An embodiment of the present invention is directed to isolating faults within processing lanes so that the faults do not impact the entire site. Accordingly, there is no single point of failure. By isolating a failure, the underlying system achieves performance and efficiency benefits. For example, read functions may require less capacity and processing than write functions. In some situations, read operations may be faster than write operations and typically have a lower chance of failure. As a result, write functions are more likely to fail than read functions. In general and depending on the application or business, users perform less write functions than read functions. Read functions may be delayed or otherwise impaired when write functions are backed up. Sometimes, the system lacks the capacity to perform read functions when write functions are queued up. By using processing lanes designed for specific functions according to an embodiment of the present invention, processing delays may be minimized and user experience is improved. An embodiment of the present invention is directed to distributing workload across multiple areas to prevent a failure in one location to affect and spread to other areas and functions. Using local functions, a higher level of availability is achieved than read/write processing that is performed remotely. This is because remote processing may require data to be transmitted and received via a network. Because local processing does not need the additional network component, local processing is more stable and less prone to impairments.

For example, a typical customer of a financial institution may perform a series of functions when visiting a banking website. A customer may login, get balances from one or more accounts, view transactions, etc. For example, a customer may want to verify that a particular check got cashed. The customer may also take other actions, such as make a payment, transfer functions, pay off a loan, open a new account, etc. An embodiment of the present invention may identify a customer and track the customer's actions and thereby learn the customer's behavior. A customer may vary and/or evolve his interactions with the banking website based on events (e.g., pay period, tax season, etc.), time period (e.g., holiday, etc.), life-events (e.g., new home, new child, college, etc.).

According to another embodiment of the present invention, the system may recognize personalized usage of a particular customer or type/profile of customer. And based on the customer's profile or usage, a specific set of processing lanes may be provided that best accommodates that customer. For example, processing lanes may be created for functions, such as login, payments, commercial banking, business banking, etc. An embodiment of the present invention may create compartments for various operations and activities. Also, processing lanes may be applied based on the user type, predicated user behavior, profile, etc., and may be configured and/or adjusted based on user behavior and action, events, etc.

Processing power or other feature associated with each dedicated processing lane (or swim lane) may vary based on the type of processing required or expected from a customer. For example, a customer of a small business may perform many more actions than a regular banking customer. As a result, the processing lanes associated with local and remote write functions may be augmented for the customer of a small business. Also, a college student may have an entirely different customer experience than a high wealth investor. Accordingly, the processing lanes may be configured differently for each customer or type of customer.

An embodiment of the present invention is directed an improved architecture that comprises co-location facilities where each co-location may contain two or more groups of customers, which may be managed in an independent set of infrastructure referred to as a "pod." Each pod may represent a physical representation of a website for a discrete group of customers or users. According to an embodiment of the present invention, redundancy may be built into each pod and also into processing or swim lanes in a pod. For example, if a pod fails or is performing slowly, the pod may be instructed to failover to a backup pod. The backup pod may be a closest pod, neighboring pod, a geographically close pod, related pod, affiliated pod, etc.

An embodiment of the present invention is directed to a distributed architecture that seeks to replicate functions and capabilities for a set of customers of a larger enterprise application at a local site. Other functions and capabilities for other sets of customers may be replicated at other local sites. This architecture reduces the company's footprint to a manageable size and focuses on addressing a particular customer base. According to a pod architecture of an embodiment of the present invention, data for customers may be replicated from an enterprise or other central location, and made available to a specific pod that is geographically relevant to those customers for performance and resiliency.

An embodiment of the present invention may determine what data is to be replicated from the enterprise to the pod and vice versa. For example, data that does not change frequently or is not subject to change may be stored at a pod. Such information may generally include information about a customer, transaction history, enrolled services, reports, current accounts, etc. In general, data stored in the pod may include data that is accessed often and is important to the customer. This information may be different for each customer, as customers may have differing needs and behavior. By having important and relevant data for the customer stored locally at a geographically relevant co-location, the customer may experience improved performance, personalized service and richer data presentation.

Information that is not stored in the pods may include information that is subject to change or changes frequently, such as stock position, etc.

According to an embodiment of the present invention, each co-location facility may have a failover pod which may support another pod in the event of a failover. In the event of a total co-location failure, each pod of the co-location may failover to different locations.

The co-location configuration may include three pods, two of which support active customer segments during normal operations and a third pod reserved for failover of either of two adjacent co-locations. Other configurations may be implemented that involves different number of pods. For example, the co-location may have multiple customer sets along with multiple failure mode pods, depending on the overall system or network architecture. Other architectures and schemes may be implemented. A network may include co-locations with three pods in some areas and other co-locations with more than three pods in other areas. For example, co-locations that service a denser population may maintain more than three pods. The population factor may also consider customer usage, services enrolled, behavior, marketing efforts, etc., not just the number of customers.

To improve performance and resiliency of the digital platform, a subset of enterprise data may be replicated to each pod. The enterprise data may include data that is read often but changes relatively infrequently.

According to another exemplary illustration, a pod may have a hierarchy of failover pods in the event that a designated failover pod is unable to support the pod. For example, a total blackout may occur in a geographic area that affects multiple co-locations. The hierarchy may consider scenarios where multiple neighboring pods and/or the volume of pods that are affected. For example, if two co-locations that are each other's failover pods are affected, each pod may failover to a (second) neighboring co-location. However, if a larger number of co-locations are affected, each pod in the co-locations may failover to other pods in a more distributed manner across a wider geographic area. Therefore, a pod may serve as a failover pod as well as second, third or other tier back-up to other pods in other locations.

FIG. 1 is an exemplary diagram of a pod-based digital architecture, according to an embodiment of the present invention. The pod-based architecture may include multiple co-locations distributed across geographic locations. Each co-location may include multiple pods that receive enterprise data relevant to a particular segment of customers, users or business. An architecture of an embodiment of the present invention is directed to placing data closer to the customer, to improve performance and availability via a highly distributed architecture with independent co-locations and pods within each co-location. With the pod-based architecture of an embodiment of the present invention, as a customer's data changes in the enterprise, it may be streamed real-time to the relevant pod. This allows a customer to continue to do business even if back-end systems are subsequently not available or otherwise impaired.

As shown in FIG. 1, a customer 120 may access a website via a user interface. The website may be hosted by an entity that provides a service, information and/or product. Entities may include, by way of example, a financial institution, corporation, merchant, service provider, etc. Upon a user action or other interaction via the website or user interface, the request may be sent to a Router 122, via 102. The request may be a request to perform various functions available to the user. Functions may depend on the application, business, etc.

According to another embodiment of the present invention, each pod may host a website or other electronic interface where users may access data as well as provide data. For example, a user may submit and access information through User Interface to view data, submit requests, provide data and/or perform other actions. Each pod may communicate with various entities via communication networks. For example, Pod 134 may receive inputs from a customer. The user interface may provide an interactive user display.

Router 122 may then route the request, via 104, to an appropriate co-location facility, shown by 130, 140 and 150, respectively. Each co-location facility, represented by 130, 140 and 150, may include a Security interface, represented by 132, 142 and 152, and a set of pods, represented by 134, 144, 154, respectively. Dynamic data may be forwarded to the user via 114. Static content may be transmitted from a co-location facility to a content delivery network shown by 170, via route 112. Content may be delivered from a remote facility shown by 172 via network 170. Static content may be then be delivered to the user, via 116.

For example, Pod 134 may represent two or more pods where each pod is designated to a user or customer segment. Additional pods may be implemented across various geographic areas. The pods may be scaled horizontally to any number. For example, some locations or geographic areas may need a small number of co-locations concentrated in specific areas whereas other locations or geographic areas may implement a large number of co-location distributed across the country and beyond.

The co-locations may be supported by a main processing center, such as an enterprise. Enterprise may include one or more datacenters and/or processing centers. As illustrated in FIG. 1, representative Datacenter 160 may provide updates, such as real-time updates, to each of the pods. For example, in the financial institution application, Datacenter 160 may provide updates relating to data, such as DDA, card, mortgage, automobile loans, line of credit, investments, etc. Datacenters may be located at a centralized location or distributed across multiple areas.

While a single datacenter is illustrated in exemplary FIG. 1, the system may include multiple databases at the same location or separated through multiple locations. The databases may be further combined and/or separated. In addition, the databases may be supported by a Host Entity or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Additional features may include a responsive design where the application is designed to be responsive to any screen size. A pipelining function enables elements on a page to be loaded asynchronously which results in reduced blocking and waiting. The architecture of an embodiment of the present invention may scale in various dimensions, e.g., adding more hardware instances; splitting customers into specific pods based on geography; and separating tasks into independent processing or swim lanes.

The pod-based architecture of an embodiment of the present invention is directed to performance, availability and customer experience. As for performance, for the same service call, a remote data call may be slower than a local data call. As for availability, local data has fewer data points of failure (e.g., WAN, switches, routers, etc.) may fail. As for customer experience, the combination of better performance and higher availability ultimately leads to a better customer experience.

Figure 2:
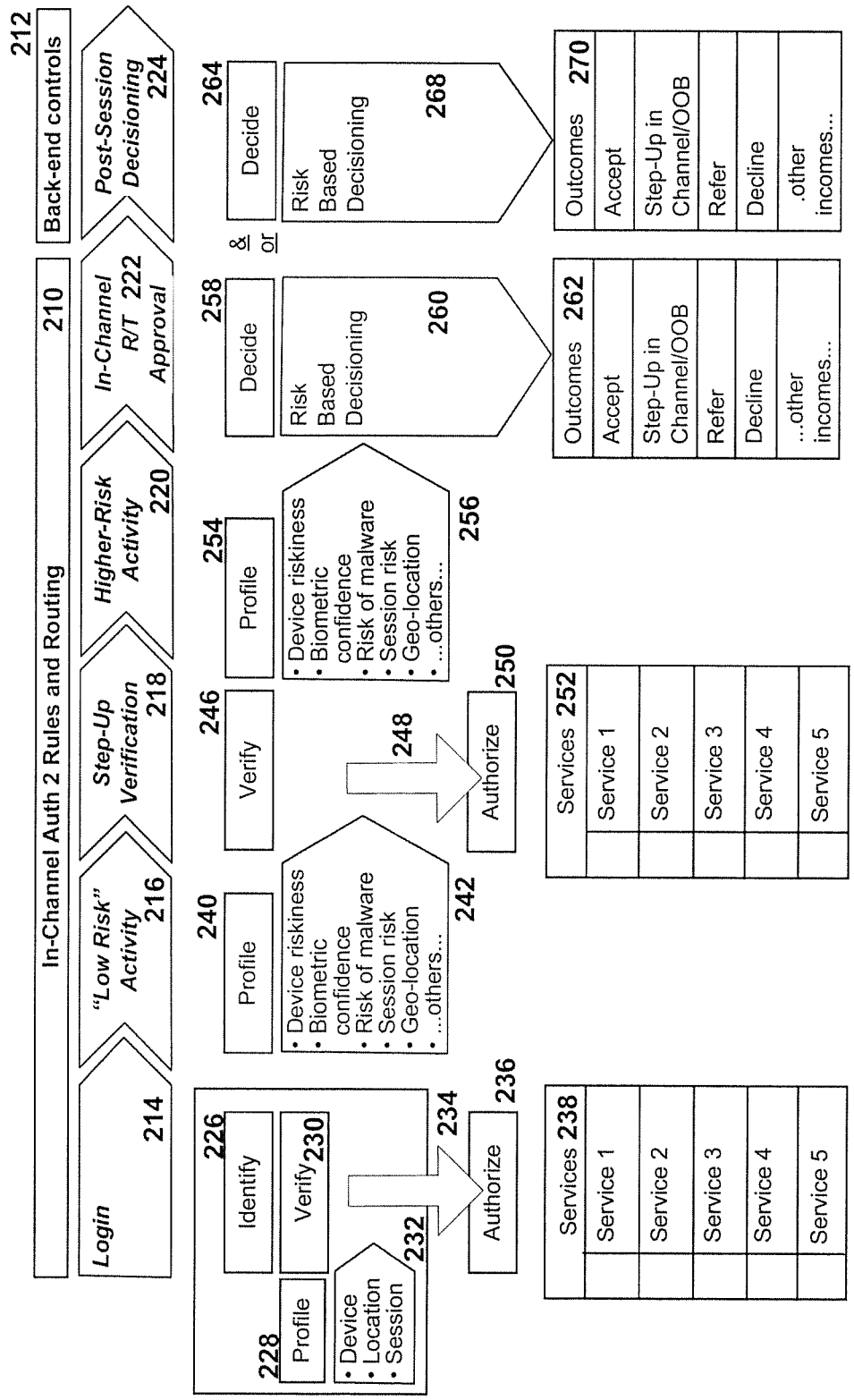
FIG. 2 is an exemplary illustration of risk based authentication and personalization, according to an embodiment of the present invention.

FIG. 2 is an exemplary illustration of risk based authentication and personalization, according to an embodiment of the present invention. An embodiment of the present invention is directed to migrating away from a binary in or out authorization model to a dynamic, always on model.

For example, an embodiment of the present invention provides an abstracted identification and verification feature, where multiple identification and verification methods may be available. Such methods may be shared across services and channels where use of the identification and verification methods may be determined by policy rules that reflect various factors including business needs, customer type, customer preferences, risk of the activity, current and anticipated threats.

An embodiment of the present invention may be directed to real-time risk-based decisioning that supports decisions at multiple stages during a session (e.g., login, step-up, transacting, accessing higher risk services, performing higher risk activities, etc.). As shown in FIG. 2, various rules and routing may be applied. A user may perform a series of functions and tasks, starting at Login 214. As shown in FIG. 2, a login function 214 may include an identification 226 and verification 230 function. A user profile 228 may provide information relating to device, location, session, as shown at 232. Upon approval, shown by 234, authorization may be provided at 236.

The user may request to perform low risk activity, shown at 216. Profile 240 may be accessed to verify, at step-up verification 218, whether the user is authorized to perform the low risk activity. Profile 240 may include device riskiness, biometric confidence, risk of malware, session risk, geo-location, etc. Also, verification process may be shown at 246. Upon approval, shown by 248, authorization may be provided at 250. Tiered services may be available upon authorization, as shown by 238 and 252.

The user may then seek to perform a higher-risk activity, as shown at 220. User profile information, shown at Profile 254, may be accessed to determine authorization, shown by in-channel R/T approval 222, and risk-based decisioning at 258. Back end controls 212 may include post session decisioning 224. Risk based decisioning may be provided at decisioning processes 258 and/or 264, as shown by 260 and 268, respectively. An appropriate outcome may be provided, as shown by 262 and 270.

An embodiment of the present invention may be directed to tiered services. Authentication may drive services and activity that may be carried out by a user's identity (e.g., customer, etc.). For example, customers may "step-up" verification to perform higher risk services, which may be configured by parameterized tables.

An embodiment of the present invention may be directed to risk profiling where multiple forms of profiling and risk assessment may be carried out throughout a session. Risk assessment may be considered in decisions on the activities that can be performed, and then provided to downstream decisioning systems. For example, a profile may consider information, such as device riskiness, biometric confidence, risk of malware, session risk, geo-location, etc. Exemplary profiles may be shown at 240 and 254, with corresponding details shown at 242 and 256.

Figure 3:
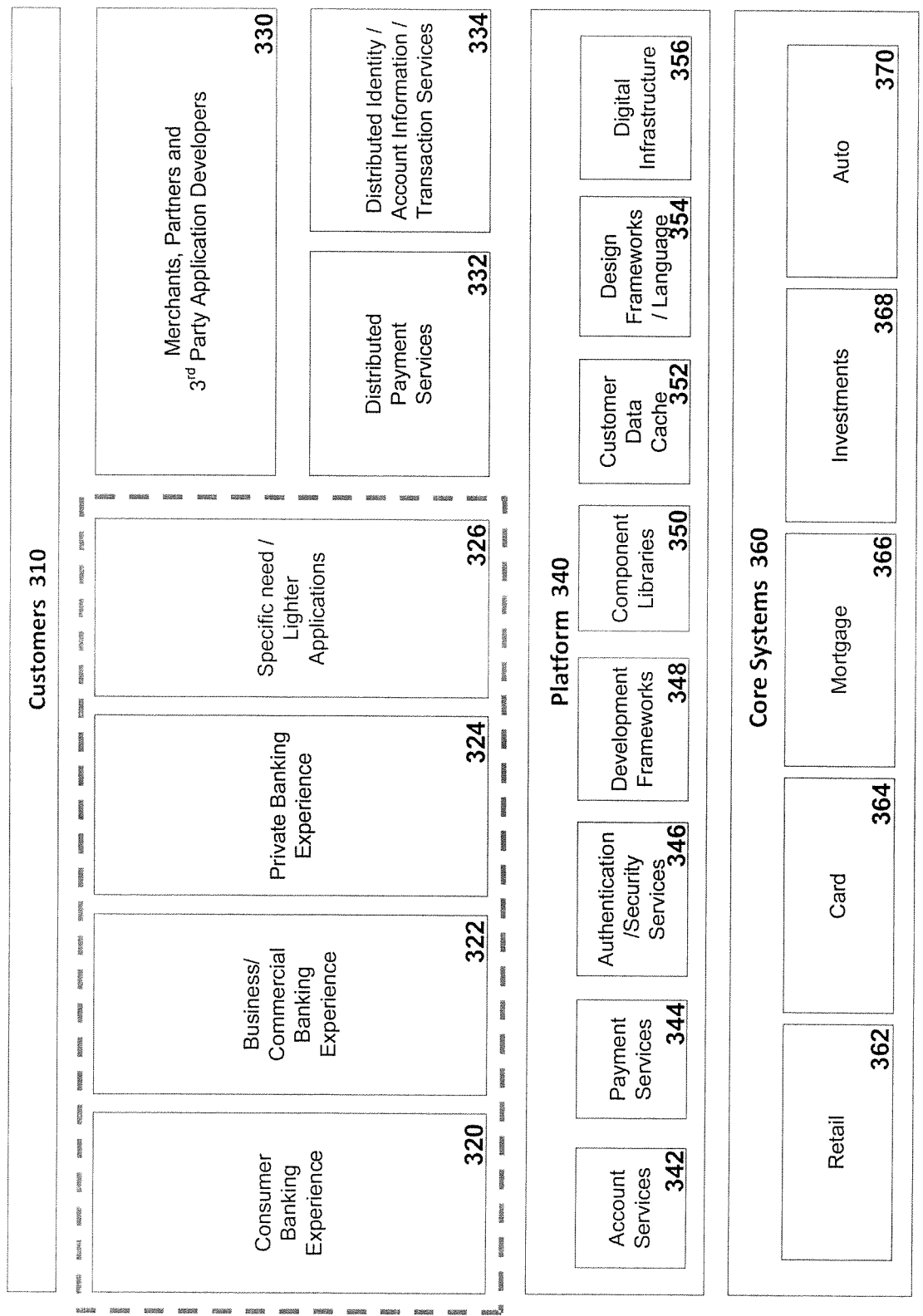
FIG. 3 is an exemplary illustration of an extensible platform, according to an embodiment of the present invention.

FIG. 3 is an exemplary illustration of an extensible platform, according to an embodiment of the present invention. FIG. 3 illustrates an exemplary application involving a financial institution. However, the various embodiments of the present invention may be applied to other entities, industries and areas of business. As shown in FIG. 3, customers 310 may interact with an entity, where the entity may be a financial institution that provides customer banking experience 320, business/commercial banking experience 322, private banking experience 324 specific need/lighter applications, e.g., electronic wallet, 326. Customers 310 may also interact with other entities, such as merchants, partners and third party application developers as represented by 330. Other services may include Distributed Payment Services 332 and Distributed Identity/Account/Information/Transaction Services 334.

Platform 340 may include various functions, such as account services 342, payment services 344, authentication/security services 346, development frameworks 348, component libraries 350, customer data cache 352, design frameworks/language 354, and digital infrastructure 356. Core Systems 360 may include various businesses within a system. In the example of a core banking system, the corresponding businesses may include Retail 362, Card 364, Mortgage 366, Investments 368 and Auto 370.

An embodiment of the present invention is directed to a digital platform design that provides a digital experience for an online channel, focused around a dependable digital storefront, a customer centric design and efficient, yet continual innovation. For example, a dependable digital storefront provides enhanced availability where impact of outages may be minimized through modularization of the website or interface. Page loads may occur quicker and with consistency. A customer centric design provides a single architecture for most or all digital screens and provides an engaging, simple and intuitive user experience. For instance, innovations may be provided on deeply personalized customer experiences. An embodiment of the present invention may further accommodate and support continuous and rapid changes, which may be deployed weekly, daily or even hourly depending on the functionality.

An embodiment of the present invention is directed to minimizing and/or eliminating single points of failure by duplicating functionality. Also, elements of a page may load asynchronously to reduce or eliminate waiting and blocking. An embodiment of the present invention is directed to isolating components of the platform to limit individual failures from spreading to other components. Also, scaling may be accomplished in multiple dimensions, such as by adding more hardware instances, by splitting customers into specific pods based on geography and by separating tasks into independent processing or swim lanes.

Figure 4:
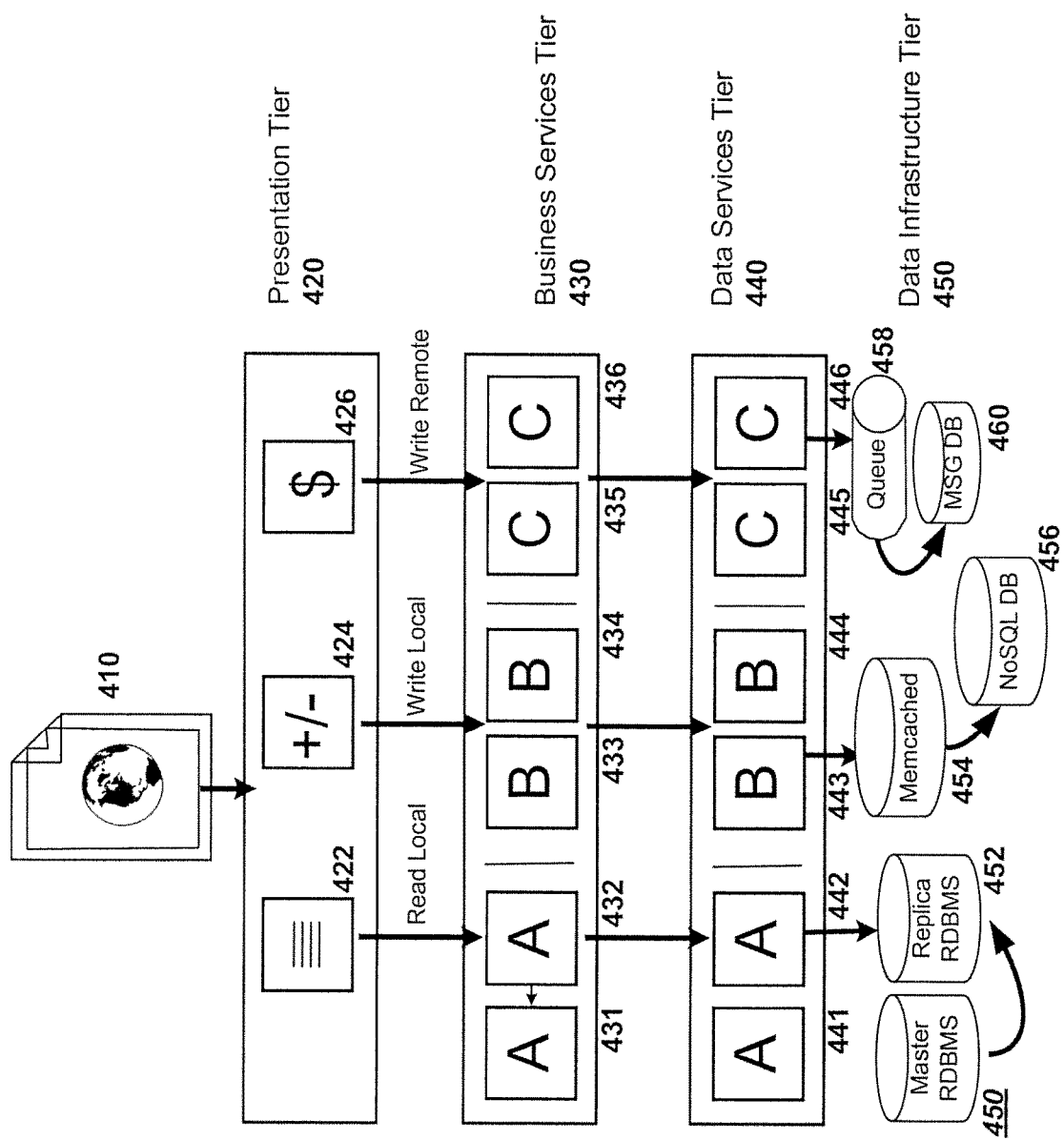
FIG. 4 is an exemplary illustration of an application architecture with designated processing lanes, according to an embodiment of the present invention.

FIG. 4 is an exemplary illustration of an application architecture with designated processing lanes, according to an embodiment of the present invention. An embodiment of the present invention is directed to a modular interface with separate processing or swim lines for local processing, including functions, tasks, local read and local write. For example, the swim lanes may utilize separate stacks with multiple tiers, such as a presentation tier, business services tier, data service tier and a data infrastructure tier and/or various combinations thereof. An embodiment of the present invention is directed to functional modularity with separate swim lanes utilizing separate stacks to deliver a singular user experience that minimizes load times and maximizes reliability. An example of functional modularity may include read and write functions.

As shown in FIG. 4, the application architecture of an embodiment of the present invention may include multiple tiers, such as Presentation Tier 420, Business Services Tier 430, Data Services Tier 440, and Data Infrastructure Tier 450. The tiers are exemplary, depending on the entity or application, more or less tiers may be implemented and the exemplary tiers may be further combined.

In this example, a user may access a webpage 410 (or other interface or other source of data). The user may perform various actions, such as actions that involve various types of processing, including reading data and writing data. Presentation Tier 420 represents a thin layer for displaying the user interface (UI) and building a page by making parallel requests to a business services layer. At Presentation Tier 420, a user may perform various functions, such as read local 422, write local 424 and write remote 426. Other processes and/or functions may be made available. Presentation Tier 420 may also provide customized information, including user preferences, profile, marketing data, etc.

Business Services Tier 430 may encapsulate business logic. For example, within the Business Services Tier 430, there may be services that execute on a set of business logic. The business logic may execute tasks, such as funds transfer, show account balance, etc. This tier may call other services in its swim lane. A swim lane may represent a designated processing lane or area. In this example, Read local swim lane may process data requests 432 and 431. Write Local swim lane may process data requests 433 and 434. Write Remote swim lane may process data requests 435 and 436.

Data Services Tier 440 represents a data abstraction layer that encapsulates schema and database type. For example, within the Data Services Tier 440, there may be services that communicate with a system of record databases, which may include customer database, deposits database, card database, mortgage database, etc. Other sources of data and information may be accessed. In this example, Read local swim lane may process data requests 442 and 441. Write Local swim lane processes data requests 443 and 444. Write Remote swim lane processes data requests 445 and 446.

Data Infrastructure Tier 450 may persist data to storage devices. In this example, Read local swim lane stores data in a local data storage, represented by Master RDBMS 450 and Replica RDBMS 452. Write Local swim lane stores data in local data storage, represented by Memcached 454 and noSQL DB 456. Write Remote swim lane may store data in a remote database, as represented by queue 458 and MSG DB 460, over a network.

An embodiment of the present invention is directed to adopting a modular architecture to improve stability. For example, an embodiment of the present invention addresses and/or prevents failure of a single feature or function from bringing down an entire website. In the modular architecture of an embodiment of the present invention, if any one functionality goes down, no other part of the website goes down.

Figure 5:
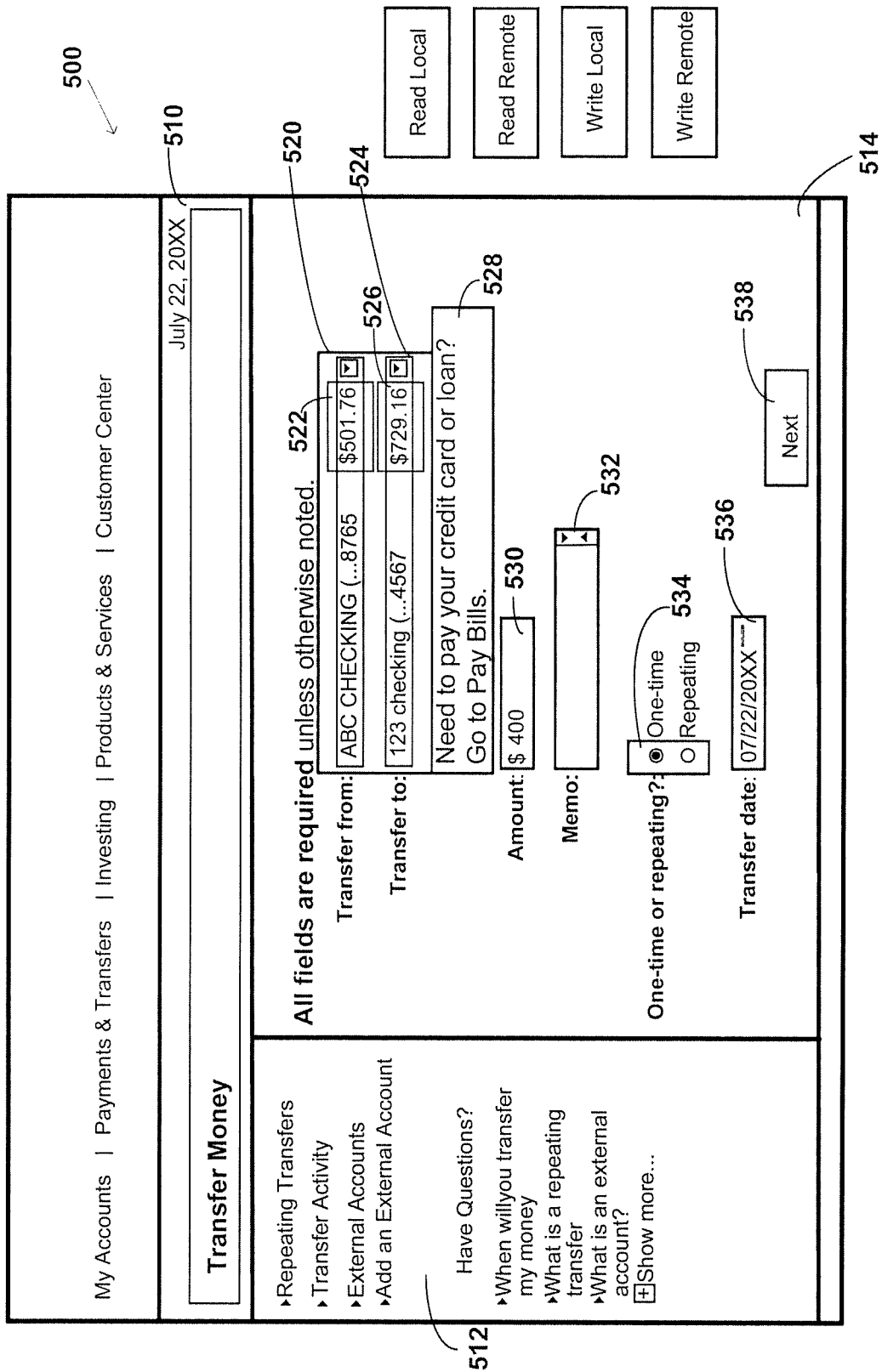
FIG. 5 is an exemplary illustration of a user interface, according to an embodiment of the present invention.

FIG. 5 is an exemplary illustration of a user interface, according to an embodiment of the present invention. In this example, webpage 500 includes several sections, including a header section 510, panel 512 and main panel 514. These sections may correspond to read local processing. As shown in FIG. 5, main panel 514 may be further divided into sections based on the type of processing. Main panel 514 may include sections that correspond to read local, read remote, write local and/or write remote. Other processing may be supported as well. In this example, read local sections may include transfer from account function 520 and transfer to account 524 and a link to Pay Bills 528. Within a read local section, read remote sections may be included, such as account amount 522 corresponding to the transfer from account 520 as well as account amount 526 corresponding to the transfer to account function 524. Write local sections may include amount 530, Memo 532, One time or Repeating section 534 and Transfer Date 536. Write Remote sections may include Next 538.

Figure 6:
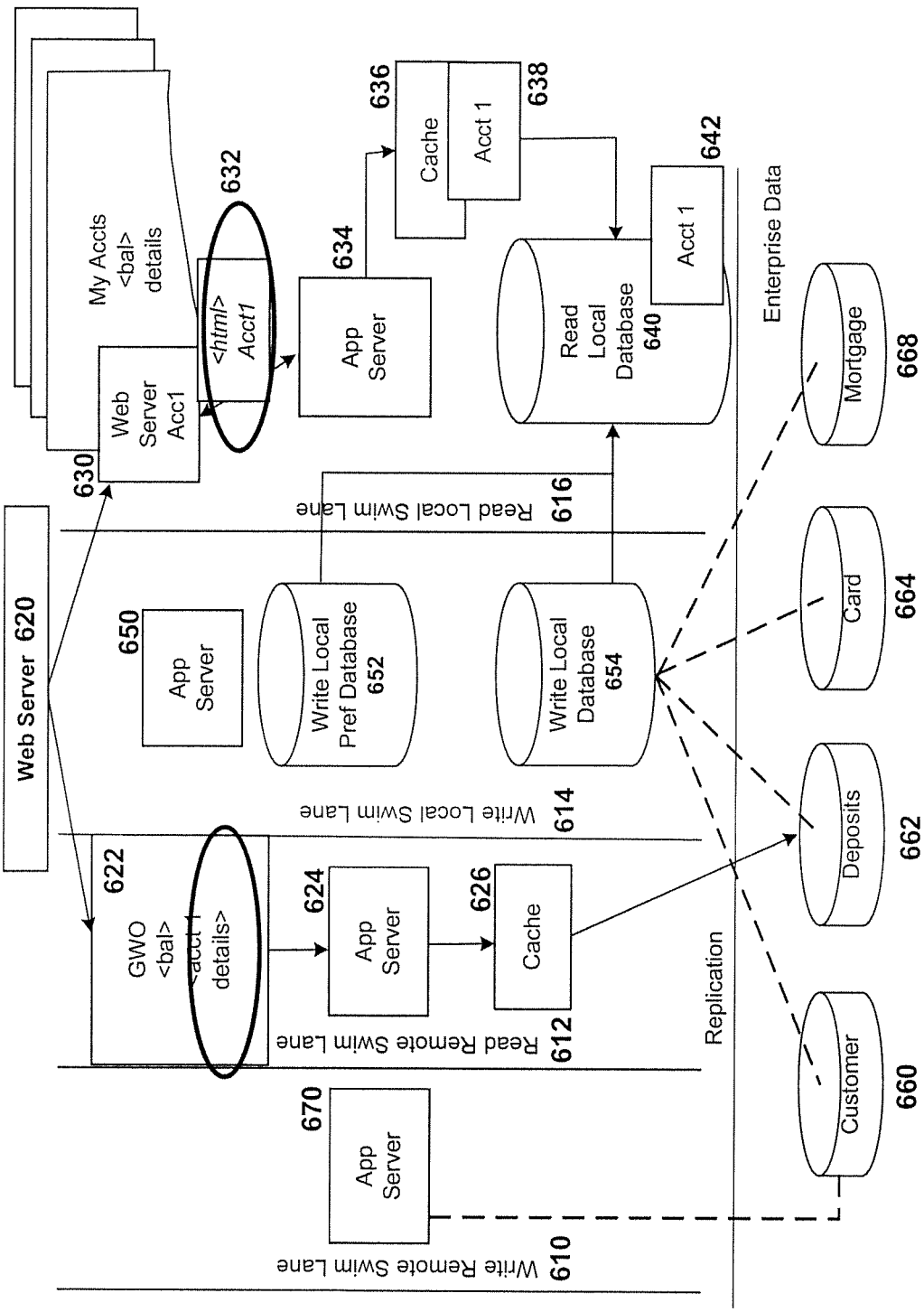
FIG. 6 is an exemplary functionality illustration of processing or swim lanes, according to an embodiment of the present invention.

FIG. 6 is an exemplary functionality illustration of swim lanes, according to an embodiment of the present invention. FIG. 6 provides an exemplary swim lane illustration that involves four separate swim lanes. Specifically, the swim lanes include write remote swim lane 610, read remote swim lane 612, write local swim lane 614, and read local swim lane 616. Additional swim lanes may be provided for other types of processing. Also, a subset of the four swim lanes may be implemented. In addition, some swim lanes may be combined or even repeated.

In this example, Web Server 620 may provide pages and/or other information and data. A user may perform various functions. Depending on the function, a particular swim lane may be invoked. For example, a user may request a balance status for the user's primary account. This information may be requested and/or accessed via a read local swim lane 616. Read local swim lane may access data that is stored locally. In general, this may include data is not subject to change or data that changes infrequently. The request may be sent to Web Server 630 to access an account, e.g., account 1, as shown by 632. The request may then be sent to Application Server 634. Cache 636 may then forward the request to Read Local Database 640 and access data for account 1, represented by 642.

Account balances and/or other account details may be accessed via a read remote swim lane 612. Account details may be accessed at 622. Application Server 624 and Cache 626 may be accessed, where Cache 626 reads from a remote database, which may include a system of databases, as shown by 660, 662, 664, 668. Other remote sources of data and/or information may be accessed. In this example, the user has requested account detail and therefore Deposits database 662 may be accessed. Because this is a remote function, the data is accessed remotely.

A user may provide an account amount, memo information, whether the payment is one time or repeat payment and a transfer date through a local write process, via Write local swim lane 614. Application Server 650 may be accessed for local write actions. Write Local Preferences (Pref) Database 652 may further access Read Local Database 640. Write Local Pref Database 652 may include preferences data, such as user preferences, etc. Write Local Database 654 may also access Read Local Database 640. Write Local Database 654 may further write to and/or exchange replication data with Enterprise Data, represented by Customer Database 660, Deposits Database 662, Card Database 664 and Mortgage Database 668. For example, Write Local Pref Database 652 may represent an operational datastore. In this example, when data from one or more remote sources (e.g., 660, 662, 664, 668) is stored and/or managed locally, the data may be consolidated into a local database, represented by Write Local Database 654.

At Write Remote swim lane 610, a write remote process may write to Customer Database 660 from Application Server 670.

Figure 7:
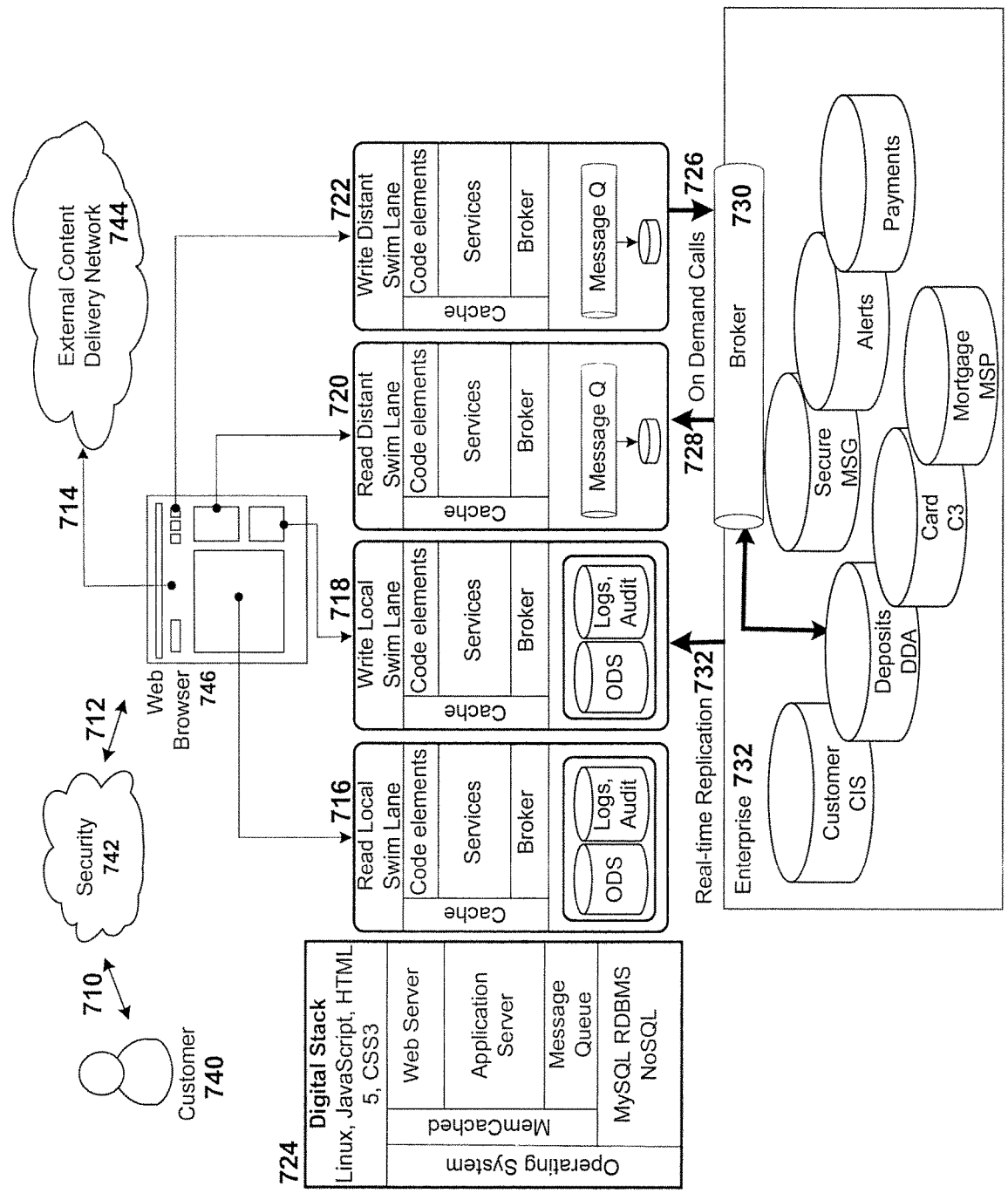
FIG. 7 is an exemplary diagram of a system architecture with processing or swim lanes, according to an embodiment of the present invention.

FIG. 7 is an exemplary diagram of a system architecture with swim lanes, according to an embodiment of the present invention. In this exemplary embodiment, Customer 740 may access a Web Browser 746 through a Security Interface 742. Customer 740 may communicate via communication line 710 to Security Interface 742 and then via communication line 712 to Web Browser 746. Security Interface 742 may provide a firewall, security access and/or denial of services prevention. According to an embodiment of the present invention, customer activities may be executed along discrete swim lanes. This architecture improves the resiliency of each pod. As illustrated, Web Browser 746 may be divided into multiple sections that correspond to different processing functions, e.g., read local, write local, read remote and write remote. In addition, read edge may be included. Other processing functions, tasks, etc. may be considered.

Data read edge may process data that may be required for every customer. This data may be static. For example, data read edge may include a login screen, company logo, style sheets, etc. Data read edge processing may occur at an External Content Delivery Network 744, via communication link 714.

Read local swim lane 716 may process data that is read often and changes infrequently. For example, read local data may include my accounts, my preference, my bill payees, etc. for a particular customer or entity. Read local swim lane 716 may include processing components, including code elements, services, broker, cache and database components, including operational databases and logs, and audit components.

Write local swim lane 718 may process data that is written in the digital channel and is not generally relevant to the enterprise. For example, data written local data may include performance logs, click history and login history. Data written local swim lane may include processing components, including code elements, services, broker, cache and database components, including operational datastore (ODS) and logs, and audit components.

Read remote swim lane 720 may process data that is accessed seldom and/or the complexity of caching the data locally is not justified. Read remote swim lane may include processing components, including code elements, services, broker and database components, including a messaging queue and storage components.

Write remote swim lane 722 may process data that needs to be sent to the enterprise for processing. For example, such data may include a payment instruction for a funds transfer. Write remote swim lane may include processing components, including code elements, services, broker and database components, including a messaging queue and storage components.

Read remote swim lane 720 may access and retrieve data from Broker 730, via communication link 728. Write remote swim lane 722 may write to Broker 730, via communication link 726. Communication may be performed via on demand calls. Broker 730 may serve as an intermediary between the swim lanes and the enterprises services. As shown in FIG. 7, Broker 730 may communicate with and access data from Enterprise 732. Broker 730 may also manage requests and/or messages to and/or from one or more of the swim lanes and Enterprises 732. Using Broker 730, pods can request data on demand from the enterprise via messaging and/or web service calls.

According to an exemplary embodiment, digital branches may be loosely coupled to Enterprise 732. Enterprise 732 may be the system of record for customer, account and transaction data which may be replicated real-time to the digital branches. Enterprise 732 may also provide the back-end for other enterprise resources, such as Alerts, Payments and Secure Messages. Data changes from Enterprise 732 may be sent to pods based on customer affinity and/or other factors.

Digital stack 724 may include various processing components, such as Web Server, Application Server, Message Queue, Cache, Operating System and database components.

Enterprise 732 may include various database components for various data, such as Customer, Deposits, Card, Mortgage, Secure Messaging, Alerts and Payments.

Figure 8:
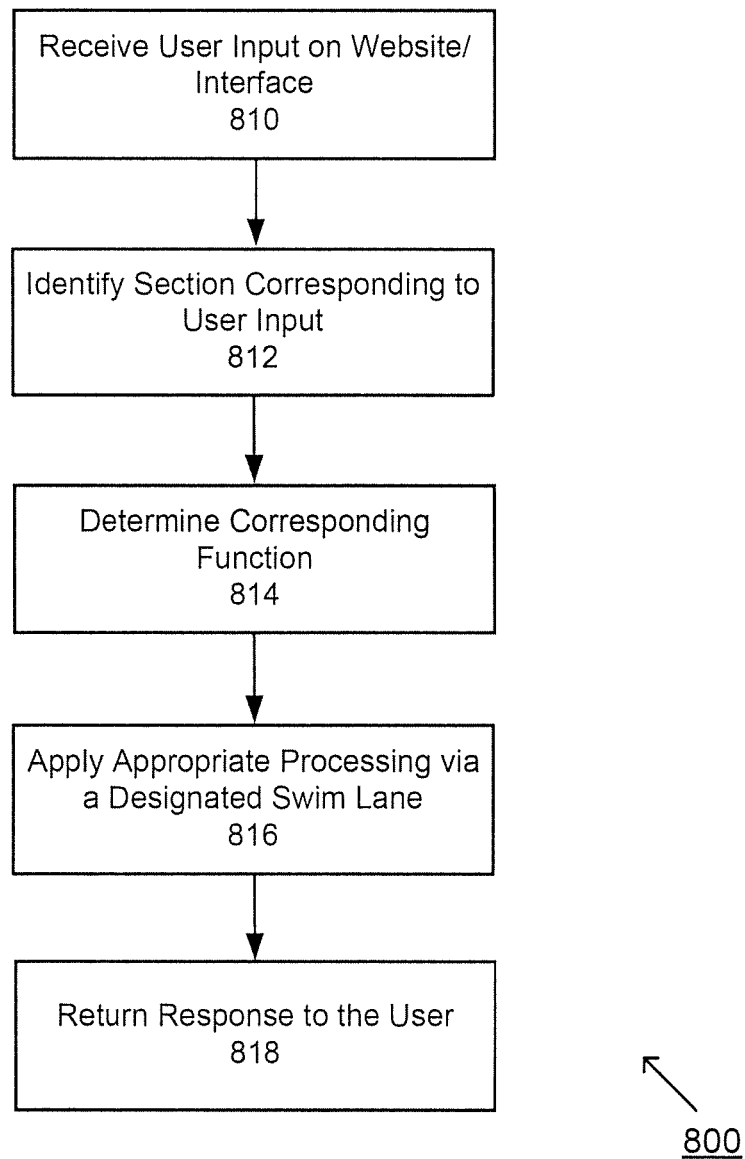
FIG. 8 is an exemplary flowchart illustrating an application architecture process, according to an embodiment of the present invention.

FIG. 8 is an exemplary flowchart illustrating an application architecture process flow that directs a user to an appropriate swim lane, according to an embodiment of the present invention. At step 810, a user input may be received via a web page or other interactive interface. At step 812, a section of the webpage corresponding to the user input may be identified At step 814, a determination may be made as to whether the section corresponds to a function, which may be local or remote. At step 816, an appropriate processing may be applied via an appropriate swim lane. At step 818, an output may be provided to the user. The order illustrated in FIG. 8 is merely exemplary. While the process of FIG. 8 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 810, a user input may be received via a web page or other interactive interface. The user may interact with a webpage or other user interface provided by an entity. The entity may be a service provider, financial institution, merchant, government entity, education entity, etc.

At step 812, a section of the webpage corresponding to the user input may be identified. The webpage may contain various sections with varying processing associated with the sections. User interaction with a specific section may be identified. The user interaction may involve a mouse click, mouse over action, user input, voice command, touch command, swipe action, movement, etc.

At step 814, a determination may be made as to whether the section corresponds to a function, which may be local or remote. For example, the webpage may comprise a combination of functions, which may be task-based (e.g., log-in, funds transfer, other action, etc.) and/or processing-based (e.g., read local, read remote, write local, write remote, etc.). Other variations may be realized. Also, some of the sections may include other sub-sections that may require a different type of processing. For example, a read local component may include write remote sections.

At step 816, an appropriate processing may be applied via an appropriate swim lane. For example, the website may have designated swim lanes for particular functions. The processing may be performed locally, remotely and/or at another location or component. In addition, the processing may be divided by function, task, action, etc. Some functions may invoke multiple levels of processing in succession or in parallel.

At step 818, an output may be provided to the user. After the appropriate processing is applied, an output may be generated and displayed to the user. The user may then interact with another section of the webpage and/or other user interface.

According to an exemplary application, a network may comprise a plurality of co-location facilities that are geographically diversified and accessed accordingly. Performance may be enhanced using geolocation services, private peering to consumer networks and a content delivery network service. Each co-location may comprise multiple groups of customers that are managed in an independent set of infrastructure components which may be referred to as a pod. For example, a co-location may have an exemplary three pods, where two are production and one pod is a back-up. According to another example, a co-location may have four pods, where two are production and two are back-ups. Other variations and configurations may be implemented. Within a network, the number of pods within a co-location may vary.

An embodiment of the present invention is directed to a pod distribution architecture to provide diversification of data center locations for enhanced performance and availability. For example, an entity, such as a financial institution, service provider, business, organization, etc., may recognize that digital user populations are concentrated in certain regions, such as regions in California, Texas, Washington D.C. and New York. Based on customer concentration, pods may be distributed in strategic geographic locations that are relevant to the highest concentration of user populations. Other entities, organizations and/or businesses may have varying user population distributions. In addition, an entity may recognize other population distributions based on various metrics, e.g., the most digital users, most branch users, most ATM users, most accounts, highest spenders, most loyal customers, most fraud events, etc.

According to an embodiment of the present invention, redundancy may be built into each pod and each swim lane in the pod. A pod may represent a service location, branch, storefront, virtual storefront, etc. If a pod fails or is performing slowly, the pod may failover to a backup-pod. The backup-pod may be a closest geographic pod. Also, the back-up pod may be a related pod, affiliated pod, similarly situated pod, etc. Each co-location facility may include a failover pod that supports another pod in the event of a failover or other impediment. In the event of a total co-location failure, each pod may failover to different locations. Also, each pod may failover to different sections of a location.

According to another embodiment of the present invention, the failover may occur in varying degrees or phases. For example, a complete failure of a pod may involve total operation from a neighboring co-location. However, the failover may occur in lesser degrees, e.g., partial failure, non-critical failure, minor failure, functional, application, database, pod component, etc. For failure impacting functional operation, a mitigation action may include non-impacted functions continue to operate. For failure from an application update, a mitigation action may include redirecting users to un-updated pod. For failure impacting database operation, a mitigation action may include use of a local data copy. For failure impacting a pod component, a mitigation action may include using redundant components. For failure impacting a pod, a mitigation action may include failover to an out-of-region pod. For failure impacting a co-location, a mitigation action may include failure to out-of-region pods. For failure impacting an enterprise, a mitigation action may include store and forward requests. Other failures may be addressed with an appropriate mitigation action.

Figure 9:
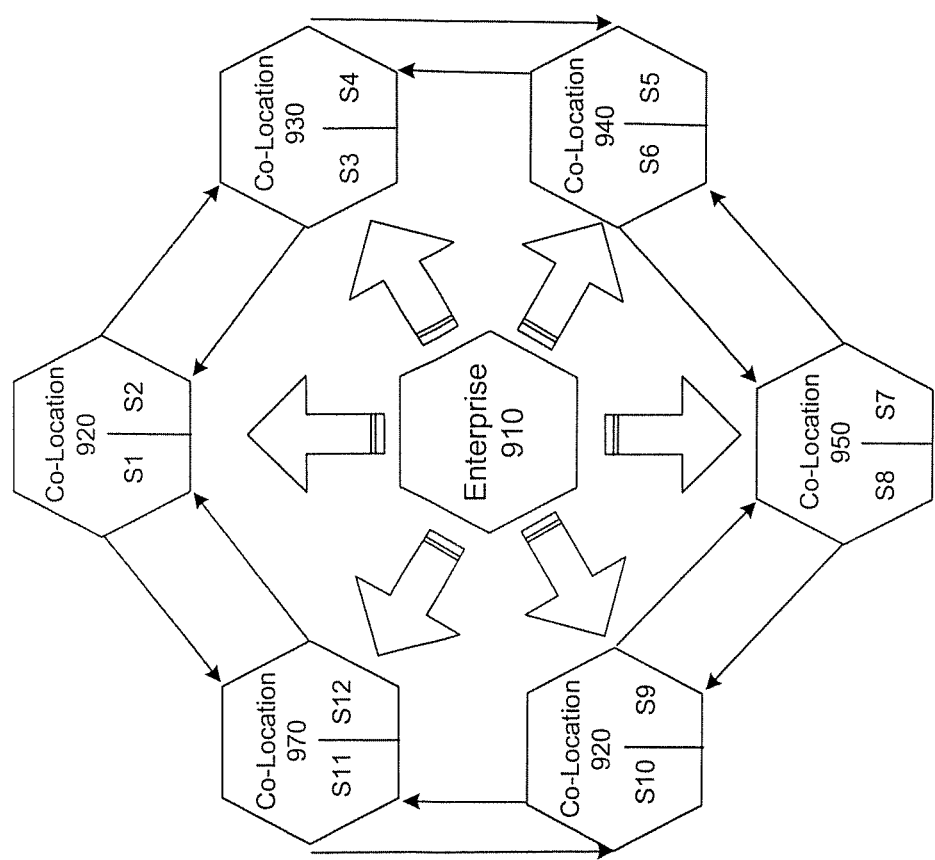
FIG. 9 is an exemplary architecture of a distribution of data and co-locations across a platform, according to an embodiment of the present invention.

FIG. 9 is an exemplary architecture of a distribution of data and co-locations across a platform, according to an embodiment of the present invention. As shown in FIG. 9, the exemplary network comprises various co-locations represented by 920, 930, 940, 950, 960 and 970, and Enterprise 910. In this example, each co-location contains two groups of customers, managed in an independent set of infrastructure referred to as a pod. For example, co-location 920 has two groups of customers represented by S1 and S2. If group S1 has a fail-over event, S1 fails over to co-location 970. If group S2 has a fail-over event, S2 will fail over to co-location 930. The links demonstrate co-locations and pods to which each pod fails over. According to an exemplary embodiment, fail-over is to a co-location that is not more than one time zone away. The two pods within a co-location may fail over to two separate co-locations. An embodiment of the present invention is directed to minimizing performance degradation due to network latency while operating in fail over mode.

Each co-location may exchange data with Enterprise 910. Enterprise 910 may be a single unit and/or an entity that is distributed across multiple units and/or areas. Various architectures may be supported. In order to improve the performance and resiliency of the digital platform, a subset of enterprise data from Enterprise 910 may be replicated to each pod at co-locations 920, 930, 940, 950, 960 and 970. Replicated data may be relevant for a particular subset of customers or users associated with each pod. Enterprise data may include customer profile, preferences, enrollments, subscriptions, accounts, account history, etc. Generally, any data that is read often but changes relatively infrequently may be replicated to/from Enterprise 910.

Figure 10:
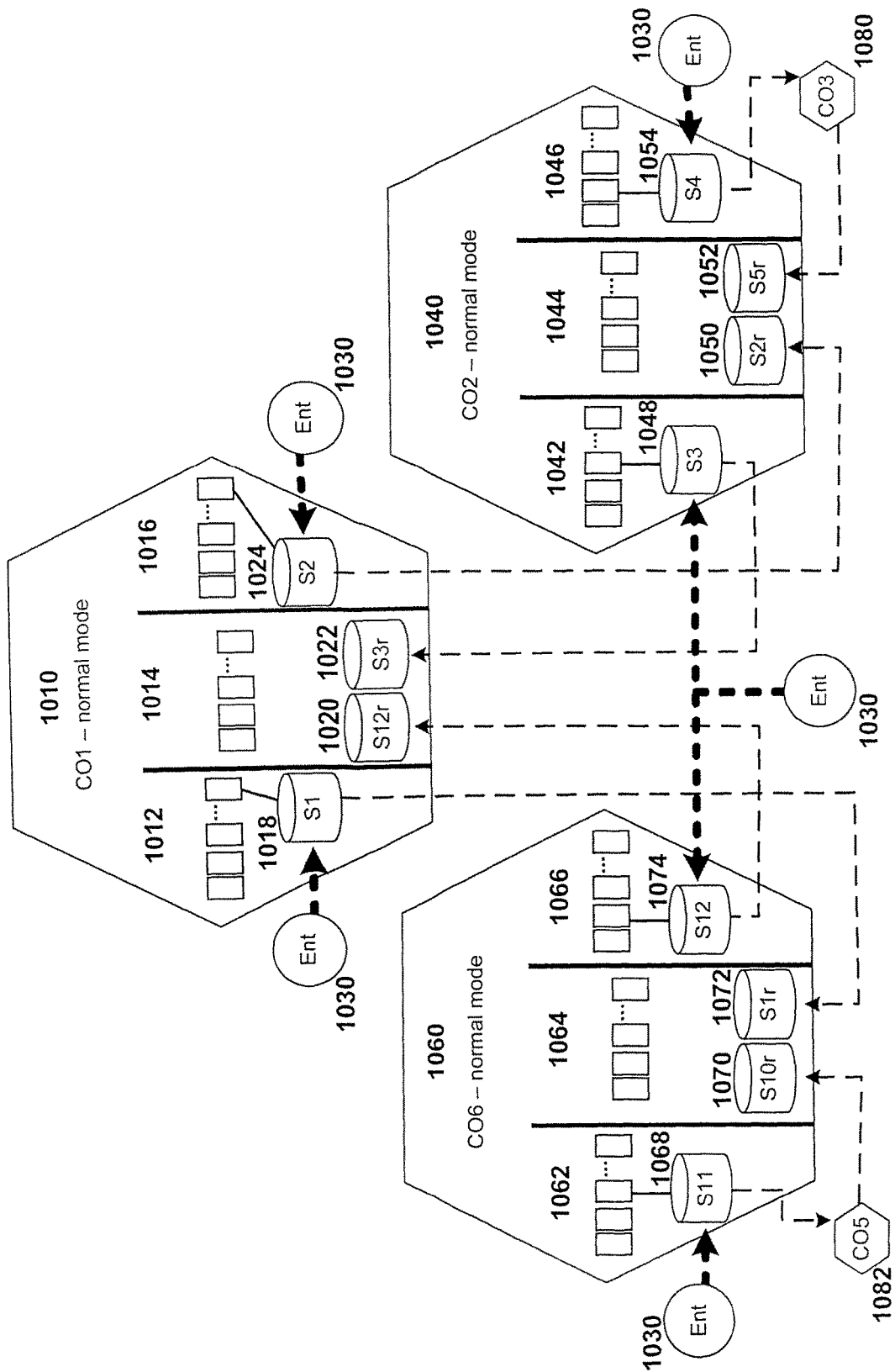
FIG. 10 is an exemplary illustration of normal condition data distribution in a co-location architecture, according to an embodiment of the present invention.

FIG. 10 is an exemplary illustration of normal condition data distribution in a co-location architecture, according to an embodiment of the present invention. FIG. 10 illustrates co-location operation during normal mode and data flow across the co-locations. Each co-location may contain multiple pods. In the exemplary illustration of FIG. 10, three pods are shown where two pods support active customer segments during normal operations. A third pod may be reserved for fail-over of either of two other co-locations. The two other co-locations may be adjacent or nearby co-locations.

As shown in the exemplary illustration of FIG. 10, co-location 1010 contains three pods, where pod 1012 supports a customer segment and pod 1016 supports another customer segment. Pod 1014 is reserved for fail-over of other co-locations, which may be an adjacent co-location 1040 and/or another adjacent co-location 1060. During normal operation, Pod 1012 and Pod 1016 support active customer segments while Pod 1014 is in idle mode. Co-locations may support inter-data center replication and receive/exchange replication data with nearby pods in anticipation of a possible fail-over or other impairment. The data may be managed by a database management system. For example, Database 1020 represents replicated data from Database 1074 from Pod 1066 of Co-location 1060. Database 1022 represents replicated data from Database 1048 from Pod 1042 of Co-location 1040. Pod 1012 may process data and further access/store data in Database 1018. Enterprise 1030 may communicate enterprise data to Database 1018. For example, Enterprise 1030 may perform business as usual (BAU) replication from data stored and/or managed by Enterprise 1030, including Enterprise System of Records (SORs). Likewise, POD 1016 may process data and further access/store data in Database 1024. Enterprise 1030 may communicate enterprise data to Database 1024.

In a similar manner, co-location 1040 contains three pods, where Pod 1042 supports a customer segment and Pod 1046 supports another customer segment. Pod 1044 is reserved for fail-over of other co-locations, which may be an adjacent co-location 1010, specifically Pod 1016, and/or another adjacent co-location 1080. During normal operation, Pod 1042 and Pod 1046 support active customer segments while Pod 1044 is in idle mode. Co-locations may support inter-data center replication and receive/exchange replication data with nearby pods in anticipation of a possible fail-over or other impairment. The data may be managed by a database management system. For example, Database 1050 represents replicated data from Database 1024 from Pod 1016 of Co-location 1010. Database 1052 represents replicated data from a database from a pod of neighboring co-location 1080. Pod 1042 may process data and further access/store data in Database 1048. Enterprise 1030 may communicate enterprise data to Database 1048. For example, Enterprise 1030 may perform BAU replication from Enterprise SORs. Likewise, Pod 1046 may process data and further access/store data in Database 1054. Enterprise 1030 may communicate enterprise data to Database 1054.

In a similar manner, co-location 1060 contains three pods, where Pod 1062 supports a customer segment and Pod 1066 supports another customer segment. Pod 1064 is reserved for fail-over of other co-locations, which may be an adjacent co-location 1010, specifically Pod 1012, and/or another adjacent co-location 1082. During normal operation, Pod 1062 and Pod 1066 support active customer segments while Pod 1064 is in idlec mode. Pod 1064 may receive replication data from Enterprise 1013 and neighboring pods, for fail-over mode. Co-locations may support inter-data center replication and receive/exchange replication data with nearby pods in anticipation of a possible fail-over or other impairment. The data may be managed by a database management system. For example, Database 1070 represents replicated data from a database from a pod of neighboring co-location 1082. Database 1072 represents replicated data from Database 1018 from Pod 1012 of Co-location 1010. Pod 1062 may process data and further access/store data in Database 1068. Enterprise 1030 may communicate enterprise data to Database 1068. For example, Enterprise 1030 may perform BAU replication from Enterprise SORs. Likewise, Pod 1066 may process data and further access/store data in Database 1074. Enterprise 1030 may communicate enterprise data to Database 1074.

In accordance with the description above, each pod may implement designated swim lanes for various functions and processes, e.g., read local, write local, read remote, write remote, etc. Depending on the business and/or application, other functions and processes may be supported for swim lane implementation.

Figure 11:
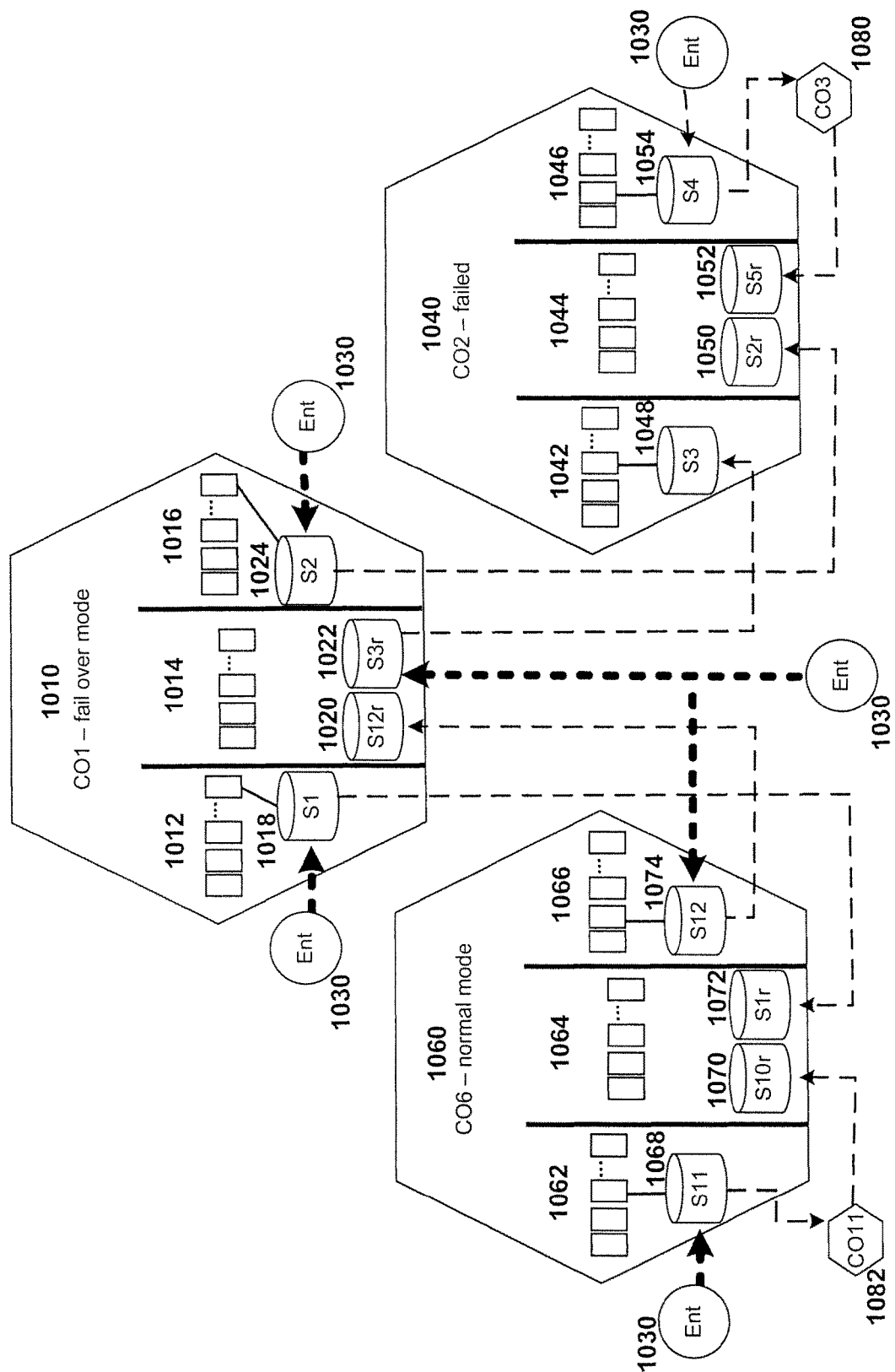
FIG. 11 is an exemplary illustration of fail-over condition data distribution in a co-location architecture, according to an embodiment of the present invention.

FIG. 11 is an exemplary illustration of fail-over condition data distribution in a co-location architecture, according to an embodiment of the present invention. FIG. 11 illustrates co-location detail during a fail over mode and data flow across the co-locations. In this example, co-location 1040 has experienced a failure event. The failure event may include power outage, data overflow, slow system, data compromise, fraud, etc. Pod 1042 can fail-over to a neighboring co-location, 1010. As shown in FIG. 11, data from database 1022 may provide support to Pod 1042. Because of the fail-over event at co-location 1040, inter-data center replication from database 1024 to database 1050 in Pod 1044 of co-location 1040 may be suspended. Likewise, inter-data replication from database 1022 to database 1048 may be suspended. Data from co-location 1080 may support Pod 1046. Also, because of the fail-over event at co-location 1040, inter-data center replication from a database at co-location 1080 to database 1052 may be suspended. Likewise, inter-data replication from a database at co-location 1080 to database 1054 may be suspended.

Figure 12:
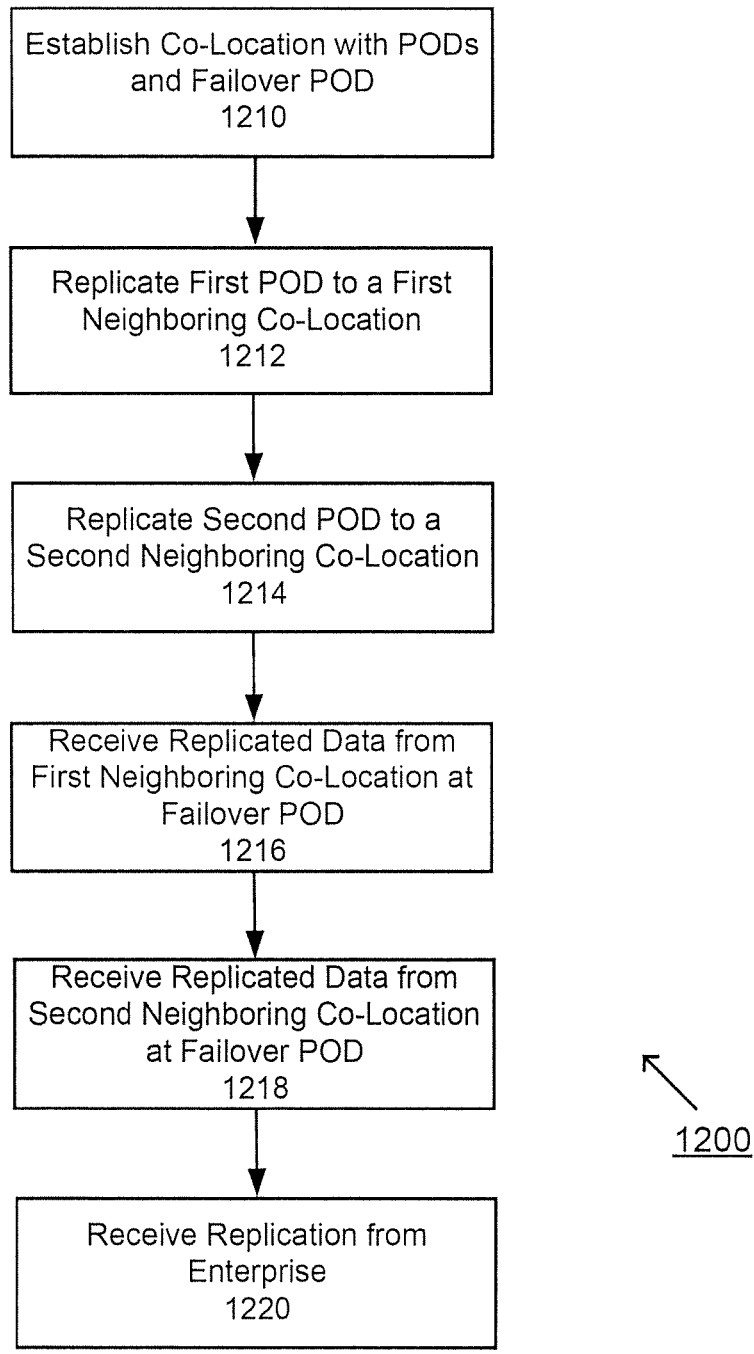
FIG. 12 is an exemplary flowchart illustrating potential deployment at a co-location, according to an embodiment of the present invention.

FIG. 12 is an exemplary flowchart illustrating potential deployment at a co-location, according to an embodiment of the present invention. At step 1210, a co-location may be established with at least two pods and at least one fail-over pod. At step 1212, data from a first pod may be replicated to a fail-over pod at a first neighboring co-location. At step 1214, data from a second pod may be replicated to a fail-over pod at a second neighboring co-location. At step 1216, the co-location may receive replicated data at the failover pod from a pod at the first neighboring co-location. At step 1218, the co-location may receive replicated data at the failover pod from a pod at the second neighboring co-location. At step 1220, the co-location may receive replication data from an enterprise managing the co-locations. The order illustrated in FIG. 12 is merely exemplary. While the process of FIG. 12 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 1210, a co-location may be established with at least two pods and at least one fail-over pod. Other variations may be implemented. For example, a co-location may have three or more pods, where each pod is dedicated to a specific group of customers/users. The pods may be divided in other ways as well. For example, each pod may be directed to a group of customers based on location, products, services, demographics, spending level, targeted marketing, etc. The pods within a network may be similarly structured, also each pod may be unique based on the geographic factors, the customer segment and/or other information.

At step 1212, data from a first pod may be replicated to a fail-over pod at a first neighboring co-location. Each co-location may include at least one failover pod which supports one or more other pods in neighboring and other co-locations when they experience a failover event. For example, a failover pod may support multiple other pods so that when neighboring pod experiences a failover, it may be supported by the failover pod. The failover pod may be assigned to a neighboring pod. Also, the failover pod may be dynamically identified based on the failover event.

At step 1214, data from a second pod may be replicated to a fail-over pod at a second neighboring co-location. To properly support neighboring pods, data from a pod may be replicated to the failover pod. The data may be replicated on a periodic basis or it may be event-driven.

At step 1216, the co-location may receive replicated data at the failover pod from a pod at the first neighboring co-location. At step 1218, the co-location may receive replicated data at the failover pod from a pod at the second neighboring co-location. At step 1220, the co-location may receive replication data from an enterprise managing the co-locations. Enterprise data may be replicated and provided to an appropriate co-location.

Figure 13:
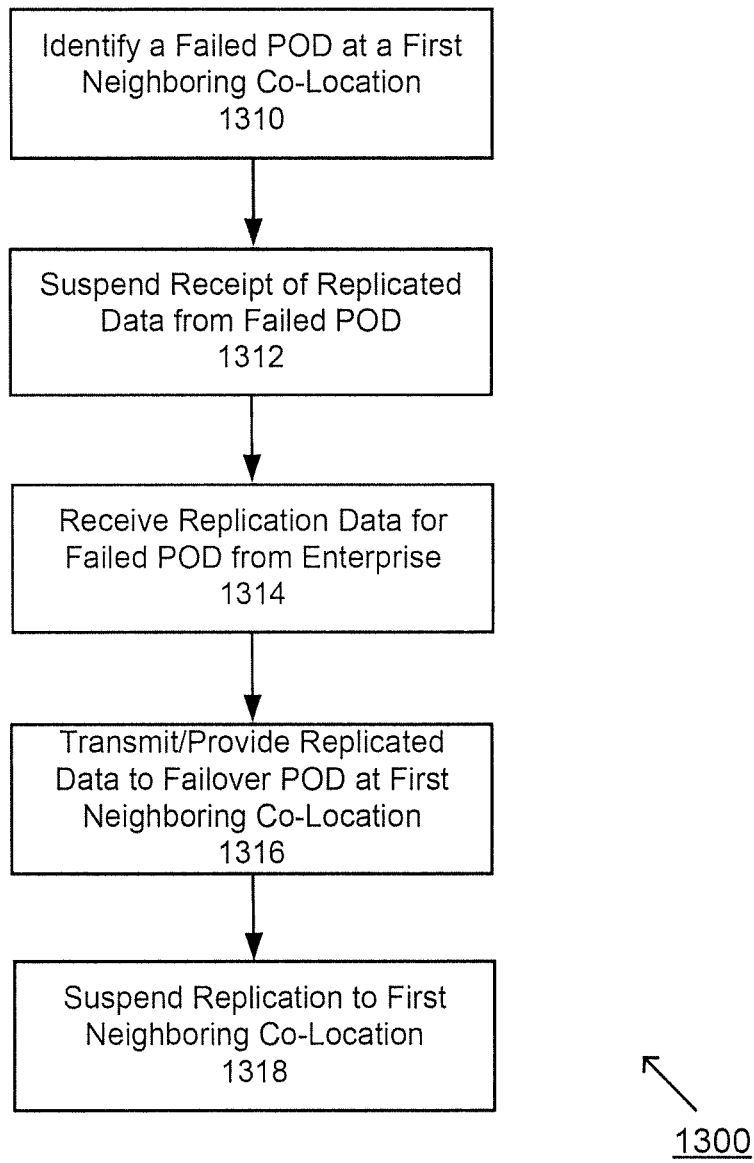
FIG. 13 is an exemplary flowchart illustrating fail-over processing on a platform, according to an embodiment of the present invention.

FIG. 13 is an exemplary flowchart illustrating fail-over processing on a platform, according to an embodiment of the present invention. At step 1310, a failed pod may be identified at a first neighboring co-location. At step 1312, inter-data replication may be suspended from the failed pod. At step 1314, replication data for the failed pod may be received from the enterprise at the fail-over pod. At step 1316, replicated may be transmitted from the fail-over pod to the failed pod at the first neighboring co-location. At step 1318, replication data may be suspended of a pod at the first neighboring co-location. The order illustrated in FIG. 13 is merely exemplary. While the process of FIG. 13 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 1310, a failed pod may be identified at a first neighboring co-location. A failed pod may send a failover message and/or other warning to initiate fail-over mode. A failure may be detected also if the failed pod does not respond to messages or fails to provide an update. The pod may experience a fail over event, which may include a total shutdown, partial shutdown, application impairment, device impairment, fraud event, data compromise, for example. The fail-over event may vary in degree of severity.

At step 1312, inter-data replication may be suspended from the failed pod. During a fail-over event, the replication action may cease until the fail-over event is over.

At step 1314, replication data for the failed pod may be received from the enterprise at the fail-over pod. At step 1316, replicated data may be transmitted from the fail-over pod to the failed pod at the first neighboring co-location. As a result, processing and operation for the failed POD may be resumed by the fail over pod. At step 1318, replication data may be suspended of a pod at the first neighboring co-location. Data receipt from the failed pod may be suspended.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Databases (which may include datacenters and other storage devices) may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to a processor, which, in some embodiments, it is accessible through a network, such as communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 and 212 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, processor(s) may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. Processor(s) may include, for instance, a personal or laptop computer, a telephone, or PDA. Processor(s) may include a microprocessor, a microcontroller or other general or special purpose device operating under programmed control. Processor(s) may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor(s) may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor(s) may also include a network-enabled appliance, a browser-equipped or other network-enabled cellular telephone, or another TCP/IP client or other device.

As described above, the system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. A system having a network architecture, the system comprising:
    a first co-location comprising:
        a first pod comprising a processor that supports a first subset of customers associated with an entity; the first pod comprising:
            a physical representation of a website for a discrete group of customers or users comprising a plurality of sections, each section corresponds to a designated processing lane;
            a plurality of designated processing lanes, where a local designated processing lane supports a local function that is limited to interacting with a local database; and a remote designated processing lane supports a remote function across a network that sends process data to an enterprise center for processing;
        a second pod comprising a processor that supports a second subset of customers associated with the entity; and
        a failover pod comprising a processor that supports one or more other pods in a second co-location and one or more other pods in a third co-location during a failover mode; and
    an enterprise datacenter that replicates data for the first subset of customers and the second subset of customers and transmits the replicated data for the first subset of customers and the second subset of customers to the first co-location.

2. The system of claim 1, wherein the plurality of designed processing lanes comprises a second local designated processing lane that supports a second local function, different from the local function.

3. The system of claim 1, wherein the local designated processing lane supports a write local function.

4. The system of claim 1, wherein the remote designated processing lane supports a read remote function wherein the read remote function is performed over the network.

5. The system of claim 1, wherein the plurality of designated processing lanes further comprises a second remote designated processing lane that supports a second remote function, different from the remote function, performed over the network.

6. The system of claim 1, wherein the first pod provides a user interface to the first set of users, the user interface comprises a plurality of segments.

7. The system of claim 6, wherein each segment corresponds to one of the plurality of designated processing lanes.

8. The system of claim 6, wherein a first segment corresponds to one of the plurality of designated processing lanes, the first segment comprising a sub-segment that corresponds to another one of the plurality of designated processing lanes.

9. The system of claim 1, wherein the remote designated processing lane comprises a messaging queue to communicate to the enterprise center.

10. The system of claim 1, wherein the first co-location comprises a third pod that supports a third subset of users.

11. A method for implementing a network architecture, the method comprising the steps of:
    Implementing a first co-location comprising:
        a first pod comprising a processor that supports a first subset of customers associated with an entity; the first pod comprising:
            a physical representation of a website for a discrete group of customers or users comprising a plurality of sections, each section corresponds to a designated processing lane;
            a plurality of designated processing lanes, where a local designated processing lane supports a local function that is limited to interacting with a local database; and a remote designated processing lane supports a remote function across a network that sends process data to an enterprise center for processing;
        a second pod comprising a processor that supports a second subset of customers associated with the entity; and
        a failover pod comprising a processor that supports one or more other pods in a second co-location and one or more other pods in a third co-location during a failover mode; and
    receiving replicated data at the first co-location, from an enterprise data center, wherein the replicated data is for the first subset of customers and the second subset of customers.

12. The method of claim 11, wherein the plurality of designed processing lanes comprises a second local designated processing lane that supports a second local function, different from the local function.

13. The method of claim 11, wherein the local designated processing lane supports a write local function.

14. The method of claim 11, wherein the remote designated processing lane supports a read remote function wherein the read remote function is performed over the network.

15. The method of claim 11, wherein the plurality of designated processing lanes further comprises a second remote designated processing lane that supports a second remote function, different from the remote function, performed over the network.

16. The method of claim 11, wherein the first pod provides a user interface to the first set of users, the user interface comprises a plurality of segments.

17. The method of claim 16, wherein each segment corresponds to one of the plurality of designated processing lanes.

18. The method of claim 16, wherein a first segment corresponds to one of the plurality of designated processing lanes, the first segment comprising a sub-segment that corresponds to another one of the plurality of designated processing lanes.

19. The method of claim 11, wherein the remote designated processing lane comprises a messaging queue to communicate to the enterprise center.

20. The method of claim 11, wherein the first co-location comprises a third pod that supports a third subset of users.

* * * * *